United States Patent

Shoberg

[15] 3,636,760
[45] Jan. 25, 1972

[54] FORCE MEASURING APPARATUS
[72] Inventor: Ralph S. Shoberg, Farmington, Mich.
[73] Assignee: GSE Incorporated, Detroit, Mich.
[22] Filed: Feb. 25, 1970
[21] Appl. No.: 13,942

[52] U.S. Cl. ................................................73/141 A, 177/211
[51] Int. Cl. ........................................................G01l 1/22
[58] Field of Search ..........................73/141 A; 177/210, 211

[56] References Cited

UNITED STATES PATENTS

| | | | |
|---|---|---|---|
| 2,487,595 | 11/1949 | Ruge | 73/141 A X |
| 2,855,779 | 10/1958 | Zaid | 73/88.5 R |
| 3,233,452 | 2/1966 | Jones | 73/147 |
| 2,536,117 | 1/1951 | Abramson | 73/141 |
| 2,995,034 | 8/1961 | Boiten | 73/141 |
| 3,277,718 | 10/1966 | Ruge | 73/141 X |
| R26,302 | 11/1967 | Seed et al. | 73/141 |
| 3,513,431 | 5/1970 | Kovacs | 73/141 X |

FOREIGN PATENTS OR APPLICATIONS

| | | | |
|---|---|---|---|
| 472,669 | 6/1969 | Switzerland | 73/141 |

*Primary Examiner*—Charles A. Ruehl
*Attorney*—Barnard, McGlynn & Reising

[57] ABSTRACT

Force measuring apparatus including an endless body having a first set of force applying elements projecting from the body for applying forces to the body in one axial direction at spaced locations and a second set of force applying elements projecting from the body for applying forces to the body in the opposite axial direction at spaced locations on the body. The force applying elements of one set are in staggered relationship with the force applying elements of the other set to cause flexural stressing of the body between adjacent force applying elements of the two sets. The apparatus also includes means for resiliently supporting a load cell on a base member in both axial and transverse directions relative to the base member so that the load cell resiliently "floats" relative to the base member.

34 Claims, 11 Drawing Figures

PATENTED JAN 25 1972
3,636,760
SHEET 1 OF 2
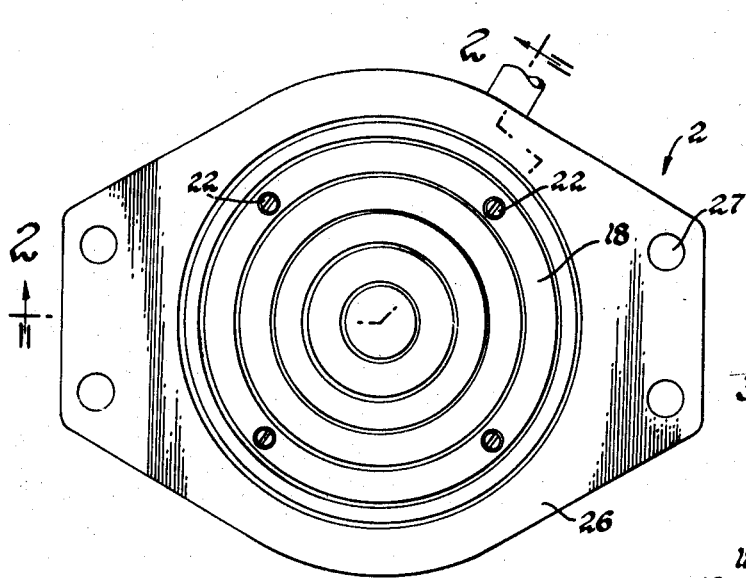
Fig.1
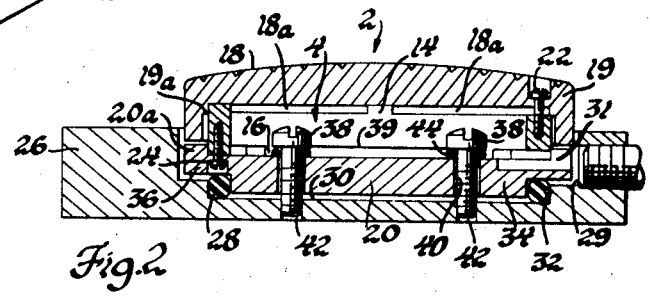
Fig.2
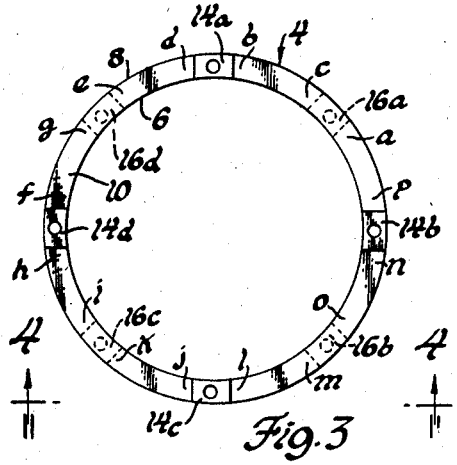
Fig.3
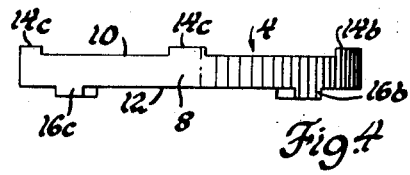
Fig.4
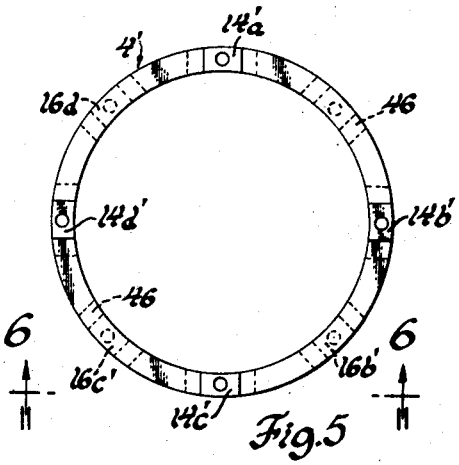
Fig.5
Fig.6
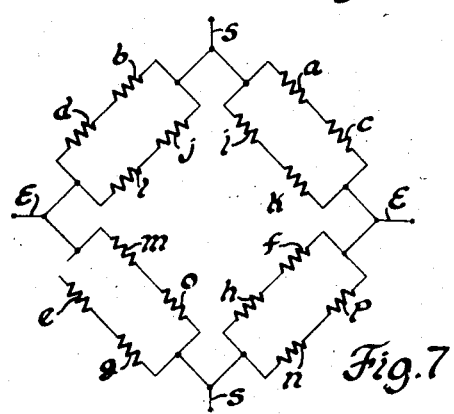
Fig.7
INVENTOR.
Ralph S. Shoberg
BY
Barnard, McGlynn & Reising
ATTORNEYS

PATENTED JAN 25 1972

INVENTOR.
Ralph S. Shoberg

BY
Barnard, McGlynn & Reising
ATTORNEYS

FORCE MEASURING APPARATUS

This invention relates generally to force measuring apparatus and is particularly concerned with the construction of force measuring apparatus particularly sensitive to forces in an axial direction relative to the apparatus but which is insensitive to, and is unaffected by, transverse forces acting on the apparatus.

A particular problem in the construction of load cells for the measurement of axial forces is that of effects of transverse or side loads, that is, loads in a nonaxial direction which interfere with the measurement of the axial forces applied to the load cells. Side loads on the load cell can be introduced due to an imbalance in the application of the load, or to frictional forces resulting from the manner in which the load cell is supported.

It is therefore an object of this invention to provide force measuring apparatus that is highly sensitive to axial loads but which is highly insensitive to nonaxial loads.

A further object is to provide force measuring apparatus wherein axial forces on the apparatus are distributed over an endless load cell body to thereby minimize the effects of nonaxial loads.

Still another object is to provide force measuring apparatus wherein a load cell is resiliently supported in both an axial and transverse direction relative to the base member to eliminate the transmission of stress between the base member and load cell.

Still another object is to provide force measuring apparatus including a load cell resiliently supported in both an axial and transverse direction with respect to a base member such that the load cell is insensitive to installation forces and to the shape of the structure on which the apparatus is mounted.

The foregoing, and other objects, are achieved by the provision of force measuring apparatus including an endless body with two sets of force applying elements projecting therefrom. One set of force applying elements applies forces in one axial direction relative to the body at spaced locations and the other set of force applying elements apply forces in the opposite axial direction to the body at spaced locations on the body. Force applying elements of one set are staggered with respect to the force applying elements of the other set so that flexural strain is applied to the body between adjacent force applying elements of the two sets, which strain can be measured by strain gages attached to the body adjacent the force applying elements in the areas of high stress. In one embodiment of the invention, the endless load cell body is reduced in cross section on each side of each of the force applying elements to concentrate the flexural stresses and strains at the force applying elements.

The endless load cell body is mounted between two force applying members. One of the force applying members is engaged with one set of force applying elements and the other force applying member is engaged with the other set of force applying elements. One of the force applying members is resiliently supported in a base member by an O-ring received in a recess formed in the base member. The force applying member is supported on the elastomeric O-ring in both a transverse and axial direction so that the load cell, in effect, "floats" with respect to the base member. Accordingly, there is a more nearly uniform transfer of forces between the load cell and base member so that the load cell is insensitive to installation forces.

Other objects, advantages and features of the invention will become apparent from the following description taken in connection with the accompanying drawings in which:

FIG. 1 is a plan view of force measuring apparatus according to the present invention;

FIG. 2 is a sectional view taken on lines 2—2 of FIG.1;

FIG. 3 is a plan view of a force or load cell body of the apparatus of FIGS. 1 and 2;

FIG. 4 is a view taken on line 4—4 of FIG. 3;

FIG. 5 is a view similar to FIG. 3 of an alternate construction of load cell body;

FIG. 6 is a view similar to FIG. 4 taken on lines 6—6 of FIG. 5;

FIG. 7 is schematic diagram of one arrangement of strain gages suitable for the load cell body of FIGS. 3 and 4;

Figure 8:
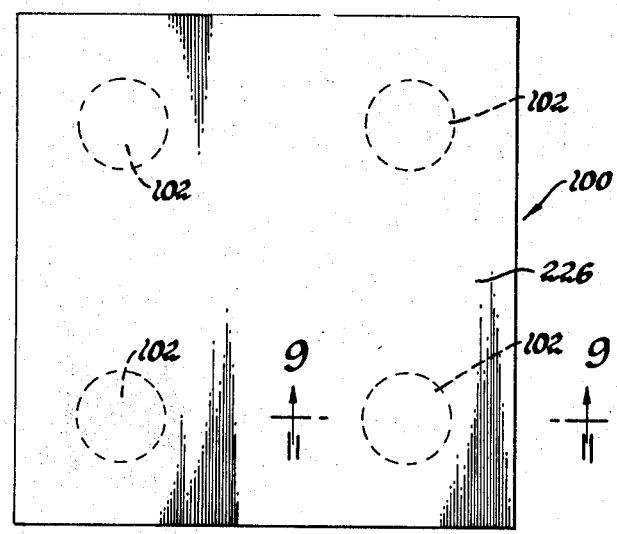
FIG. 8 is a plan view of weighting apparatus utilizing the force measuring apparatus of the present invention.

In the apparatus illustrated in FIGS. 1 through 4, reference numeral 2 collectively designates force measuring apparatus including an endless, annular body 4 having inner and other peripheral surfaces 6 and 8, respectively, extending between a pair of spaced end surfaces 10 and 12 (FIGS. 3 and 4). A first set of force applying elements 14 projects from body 4 for applying forces to body 4 in one axial direction at spaced locations on body 4. In the illustrated embodiment, the first set of force supplying elements 14 includes four force applying elements in the form of axially projecting support legs or pads 14a, 14b, 14c, and 14d which are equally spaced on the periphery of the end surface 10. The second set of force applying elements 16 projects from body 4 for applying forces in the opposite direction to the body at spaced locations on body 4. The set of force applying elements 16 also include four equally spaced force applying elements in the form of axially projecting support pads or legs 16a, 16b, 16c and 16d. The force applying elements 14 of the first set are in staggered, or angularly offset relationship with the force applying elements 16 of the second set to cause flexural stressing and straining of the body 4 between adjacent force applying elements 14 and 16. For example, as shown in FIG. 3, the four force applying elements 14 are equally spaced 90° from each other and the four force applying elements 16 are equally spaced 90° from each other, but the peripherally adjacent pair of force applying elements 14a and 16a are located 45° from each other. By applying axial forces to elements 14 in the opposite direction to forces being applied to elements 16, the body 4 tends to bend around each of the elements 14 and 16, the high-stress areas being located on each side of each of the elements 14 and 16.

In FIGS. 1 and 2, a force applying member 18 is engaged with the force applying elements 14, and a force applying member 20 is engaged with the force applying elements 16. THe force applying member 18 is in the form of a cap having a depending peripheral skirt 19 surrounding the annular load cell body 4. The lower surface 18a of member 18 engages the outer ends of the force applying elements 14, and an annular shoulder 19a formed at the junction of the inner surface of skirt 19 and surface 19a for centering the body 4 with respect to member 18. As shown in FIGS. 1 and 2, member 18 is threadedly attached by screws 22 with each of the elements 14.

The force applying member 20 is recessed to define an annular skirt or flange 20a projecting axially upwardly in FIG. 2. The recesses surface 39 surrounded by flange 20a engages the force applying elements 16, flange 20a serving to center body 4 relative to member 20. As shown in FIG. 2, member 20 is threadedly attached by screws 24 with each of the elements 16.

The apparatus of FIGS. 1 and 2 further includes a base member 26, and means in the form of an O-ring 28 of elastomeric material resiliently supports the force applying member 20 on the base member 26. Base member 26 is formed with a recess 30 having an endless, axially extending peripheral wall or shoulder 32 which is circular in the illustrated embodiment. The O-ring 28 is received in recess 30 and projects axially beyond the recess 30 and is restrained against radial expansion by the wall 32. Member 20 includes an axially projecting portion 34 which is received in the O-ring 28 with its outer periphery engaging the inner periphery of the O-ring 28. The member 20 also has an annular, radially projecting portion 36 which overlies the axially projecting or protruding portion of the O-ring 28 such that the force applying member 20 is resiliently support on the O-ring 28 in both an axial and transverse direction with respect to the base member. That is to say, O-ring 28 resiliently supports member 20 against movement in an axial direction toward the surface of recess 30, and also resiliently centers member 20, or supports member 20 against movement in a transverse direction in a direction to decrease the space between the outer periphery of portion 34 and the surface of wall 32.

Member 20 is formed with axially extending openings 40 for receiving a fastener 38. The base member 26 is formed with fastener receiving openings 42. The fastener 38 comprises a screw having a head portion overlying the recessed surface 39 of member 20 opposite the base member 26 with its shank extending through the opening 40 in loose, nonthreaded engagement with opening 40, and into threaded engagement with the opening 42 in the base member. The opening 40 is of greater diameter than the shank of screw 38 so that the shank of the screw does not interfere with the resilient transverse support of the member 20 relative to base member 26 provided by O-ring 28. To further enhance the resilient support of member 20 on base member 26, an O-ring 44 is clamped between the head of each of the screws 38 and the surface 39 of member 20.

The base portion 26 is formed with mounting holes 27 for mounting the base portion onto a support structure which may be, for example, a brake pedal of an automobile for brake testing. An opening 29 is formed in the wall of the base member 26 in alignment with a slot, groove or opening 31 in member 20 for receiving electrical lead wires to strain gages which may be attached to the end surface 10 of the load cell body 4.

One particular arrangement of strain gages utilizing sixteen conventional resistance strain gages is illustrated in FIGS. 4 and 7. The locations of the sixteen strain gages are indicated by reference characters $a, b, c, d, e, f, g, h, i, j, k, l, m, n, o$, and $p$ in FIG. 3. The strain gages $a-p$ are connected in a conventional Wheatstone bridge circuit as illustrated in FIG. 7 in such a manner that the apparatus is insensitive to side forces which might be encountered if a force is applied to member 18 off center. The output signal through lines S to a remote point when the Wheatstone bridge circuit of FIG. 7 is unbalanced due to flexural stresses on the body 4 is the same regardless of the point of application of the load on member 18 due to the arrangement of the diametrically opposed strain gages and overall gage/flexure symmetry.

The O-ring 28 may be of relatively hard elastomeric material having a hardness of 90 or more on a durometer scale. The hardness of the O-ring 28 may, of course, vary with the magnitude of the forces to be encountered with the particular apparatus.

FIGS. 5 and 6 illustrate an alternate construction for the endless load cell body 4 wherein a load cell body 4' is of similar construction with the load cell body 4 with the exception that notches 46 extend inwardly from the end surface 12 of body 4' on each side of each of the force applying members 14 and 16 to reduce the cross section on each side of each of the force applying elements to provide a higher concentration of flexural stresses at the force applying elements 14 and 16. The abrupt reduction in cross section at the high-stress areas provides increased sensitivity or strain per increment of deflection of the body 4' about the elements 14' and 16'.

Figure 9:
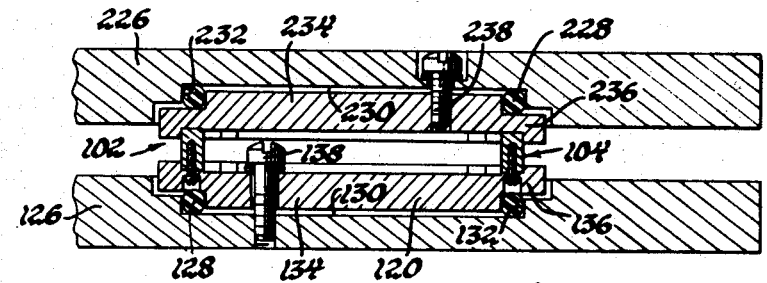
FIG. 9 is a sectional view taken on lines 9—9 of FIG. 8.

FIGS. 8 and 9 illustrate a force measuring apparatus wherein four load cells 102 supporting a platform of arbitrary shape may be utilized to measure the weight distribution of automobiles or other vehicles by measuring the force applied to each wheel of the vehicle. The apparatus 100 includes a base member 126 and four load cells 102 each of which has an endless elastomeric member in the form of an O-ring 128 which resiliently supports the respective load cell 102 in both an axial and transverse direction relative to the base member 126. A recess 130 is formed in the base member 126 for each load cell 102, the recess having a circular, axially extending wall 132 with the O-ring 128 received in the recess and projecting axially beyond the wall 132 but being restrained against radial expansion by wall 132. Load cell 102 includes an axially projecting portion 134 which is received in the O-ring 128 with its outer periphery engaging the inner periphery of the O-ring. The load cell 102 also has a portion 136 overlying the axially projecting portion of the O-ring so that the O-ring supports the load cell 102 resiliently against movement in an axial direction toward the surface of recess 130 and in a transverse direction against movement off center with respect to the wall 132. As in the arrangement of FIGS. 1 and 2, fastener means 138 may be provided for securing the load cell 102 to the base member 126 against axial separation. The fastener means 138 is in the form of a screw which has a shank smaller than the opening in the load cell member 134 so that the screw does not interfere with the transverse resilient support provided by O-ring 128.

A weighing platform 226 overlies the load cell 102 and a downwardly opening recess 230 is defined on the platform with a circular, axially extending wall 232. A second elastomeric O-ring 228 is received in the recess 230, and the load cell includes an upwardly, axially projecting portion 234 which is received in the O-ring 228 with its outer periphery engaging the inner periphery of the O-ring 228 and with a portion 236 underlying the axially projecting portion 228 of the O-ring such that the platform is supported on the load cell in both an axial and transverse direction with respect to the load cell. The resiliently floating support of the platform 226 with respect to load cell 102 and of the load cell 102 with respect to base member 126 substantially eliminates the effects of any side forces or localized forced due to the flexing or deformation of base 126 or platform 226 on the load cell 102. The result, in a practical sense, being that the input to the flexure ring section 236 is independent of the shape or location of the member applying load to platform 226 and base 126.

Figure 10:
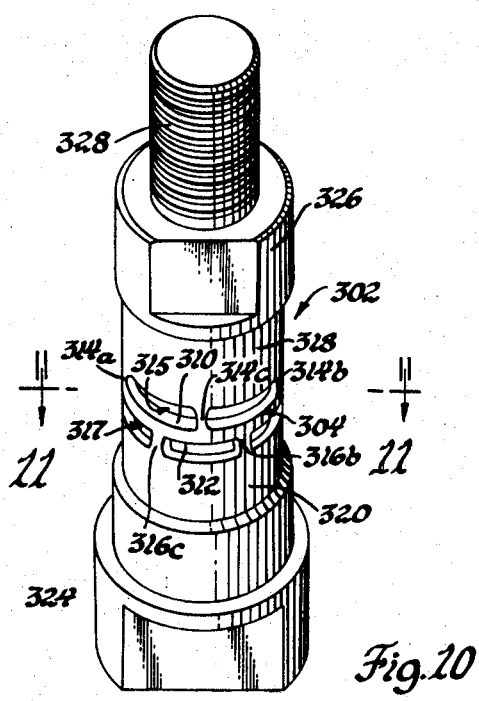
FIG. 10 is a perspective view of another embodiment of the invention.
Figure 11:
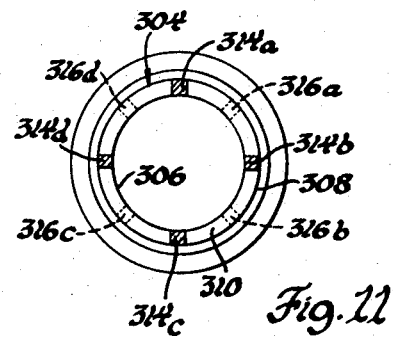
FIG. 11 is a view taken on lines 11—11 of FIG. 10.

FIG. 10 illustrates another embodiment of the invention wherein the endless load cell body is integrally formed with the load-applying members. FIG. 10 illustrates load-applying apparatus 302 comprising an endless body 304 having inner and outer peripheral surfaces 306 and 308, respectively, extending between a pair of spaced end surfaces 310 and 312. A set of force applying elements 314 projects upwardly from surface 310 and a set of force applying elements 316 project downwardly from surface 312. The force applying elements 314 are integral with a force applying member or portion 318, and the force applying elements 316 are integral with a force applying member or portion 320. The load cell of FIG. 10 may be formed of tubular stock with cutout portions 315 and 317 defining the force applying elements 314 and 316. Elements 314 and 316 are in staggered relationship with each other so that axial forces applied to the endless body 304 by the force applying elements 314 and 316 causes flexure of body 304. Member 320 is integral with an attachment portion 324 which is internally threaded for securing to a supporting member, and member 318 is integral with an attachment portion 326 having an externally threaded stem 328.

While specific embodiments of he invention have been illustrated and described in the foregoing specification and accompanying drawings, it should be understood that the invention is not limited to the exact construction shown but that various alterations in the construction and arrangement of parts is possible without departing from the scope and spirit of the invention.

The embodiments of the invention in which an exclusive property or privilege is claimed are defined as follows:

1. Force measuring apparatus comprising: an endless body having inner and outer peripheral surfaces extending between a pair of spaced end surfaces; a first set of force applying elements formed integrally on said body and projecting axially from one of said end surfaces for applying forces in one axial direction to said body at spaced locations on said body; a second set of force applying elements formed integrally on said body and projecting axially from the other of said end surfaces for applying forces in the opposite axial direction to said body at spaced locations on said body, the force applying elements of said first set being in staggered relationship with the force applying elements of said second set to cause flexural, bending stressing of said body between adjacent force applying elements of the two sets; a first force applying member engaged with said first set of force applying elements; a second force applying member engaged with said second set of force applying elements; said first force applying member being in the form of a cap having a depending peripheral skirt receiving said body; and said second force applying member having a recesses surface engaging said second set of force applying elements and an axially projecting peripheral skirt surrounding said recessed surface.

2. Force measuring apparatus as claimed in claim 1 wherein said body is reduced in cross section on each side of each of said force applying elements to concentrate the flexural stresses at said force applying elements.

3. Force measuring apparatus as claimed in claim 1, wherein said first force applying member is threadedly attached with said first set of force applying elements and said second force applying member is threadedly attached to said second set of force applying members.

4. Force measuring apparatus as claimed in claim 1, further including a base member, and means resiliently supporting one of said force applying members on said base member.

5. Force measuring apparatus as claimed in claim 6 further including a recess formed in said base member, said means resiliently supporting said one force applying member comprising an elastomeric member received in said recess.

6. Force measuring apparatus as claimed in claim 4 wherein said first force applying member is threadedly attached with said first set of force applying elements and said second force applying member is threadedly attached to said second set of force applying members.

7. Force measuring apparatus comprising: an endless body having inner and outer peripheral surfaces extending between a pair of spaced end surfaces; a first set of force applying elements projecting from said body for applying forces in one axial direction to said body at spaced locations on said body; a second set of force applying elements projecting from said body for applying forces in the opposite axial direction to said body at spaced locations on said body; the force applying elements of said first set being in staggered relationship with the force applying elements of said second set the cause flexural, bending stressing of said body between adjacent force applying elements of the two sets, a first force applying member engaged with said first set of force applying elements and a second force applying member engaged with said second set of force applying elements; a base member, means resiliently supporting one of said force applying members on said base member; a recess formed in said base member; said means resiliently supporting said one force applying member comprising an elastomeric member received in said recess wherein said recess has a circular, axially extending wall; and said elastomeric member comprising an O-ring received in said recess and projecting axially beyond said axially extending wall and restrained against radial expansion by said axially extending wall.

8. Force measuring apparatus as claimed in claim 7 wherein said one force applying member includes an axially projecting portion received in said O-ring with its outer periphery engaging the inner periphery of said O-ring, said one force applying member having a portion overlying the axially projecting portion of said O-ring whereby said one force applying member is resiliently supported on said O-ring in both an axial and transverse direction with respect to said base member.

9. Force measuring apparatus as claimed in claim 8 further including fastener means securing said one force applying member to said base member against axial separation therefrom.

10. Force measuring apparatus as claimed in claim 9 wherein said one force applying member is formed with at least one axially extending fastener receiving opening and said base member is formed with at least one fastener receiving opening, and said fastener means comprises a screw having a head portion overlying the surface of said one force applying member opposite said base member, said screw having a shank extending through the opening in said one force applying member in loose, nonthreaded engagement therewith and into threaded engagement with the opening in said base member.

11. Force measuring apparatus as claimed in claim 10 further including an elastomeric O-ring clamped between the head of said screw and the adjacent surface of said one force applying member.

12. Force measuring apparatus as claimed in claim 11 wherein said first set of force applying elements projects axially from one end surface of said body and said second set of force applying elements projects axially from the other end surface of said body.

13. Force measuring apparatus as claimed in claim 12 wherein said load cell body is annular.

14. Force measuring apparatus as claimed in claim 13 wherein said one force applying member is screw-threadedly attached to said first set of force applying elements and said second force applying member is screw-threadedly attached to said second set of force applying elements.

15. Force measuring apparatus as claimed in claim 7 further including a weighing platform overlying the other of said force applying members, and means resiliently supporting said platform on said other force applying member both axially and transversely.

16. Force measuring apparatus as claimed in claim 16 further including means defining a downwardly opening recess on said platform having a circular, axially extending wall, said means resiliently supporting said platform comprising an elastomeric O-ring received in said downwardly opening recess projecting axially beyond said axially extending wall and restrained against radial expansion by said axially extending wall.

17. Force measuring apparatus as claimed in claim 16 wherein said other force applying member includes an axially projection portion received in said O-ring with its outer periphery engaging the inner periphery of said O-ring, said other force applying member having a portion underlying the axially projecting portion of said O-ring whereby said platform is supported on said O-ring in both an axial and transverse direction with respect to said other force applying member.

18. Force measuring apparatus comprising: a base member; a load cell; means resiliently supporting said load cell both axially and transversely on said base member; a recess formed in said base member, said means resiliently supporting said load cell comprising an elastomeric member received in said recess wherein said recess has a circular, axially extending wall, and said elastomeric member comprising an O-ring received in said recess and projecting axially beyond said axially extending wall and restrained against radial expansion by said axially extending wall.

19. Force measuring apparatus as claimed in claim 18 wherein said load cell includes an axially projecting portion received in said O-ring with its outer periphery engaging the inner periphery of said O-ring, said load cell having a portion overlying the axially projecting portion of said O-ring whereby said load cell is resiliently supported on said O-ring in both an axial and transverse direction with respect to said base member.

20. Force measuring apparatus as claimed in claim 19 further including fastener means securing said load cell to said base member against axial separation therefrom.

21. Force measuring apparatus as claimed in claim 20 wherein said load cell is formed with at least one axially extending, fastener receiving opening; and said base member is formed with at least one fastener receiving opening, and said fastener means comprises a screw having a head portion overlying the surface of said load cell opposite said base member and a shank extending through the opening in said load cell in loose, nonthreaded engagement therewith, and into threaded engagement with the opening in said base member.

22. Force measuring apparatus as claimed in claim 21 further including an elastomeric O-ring clamped between the head of said screw and the surface of said load cell.

23. Force measuring apparatus as claimed in claim 21 wherein said load cell comprises an endless body having inner and outer peripheral surfaces extending between a pair of spaced end surfaces; a first set of force applying elements projecting from said body for applying forces in one axial direction to said body at spaced locations on said body; and a second set of force applying elements projecting from said body for applying forces in the opposite axial direction to said body at spaced locations on said body; the force applying elements of said first set being in staggered relationship with the force applying elements of said second set to cause flexural stressing of said body between adjacent force applying elements of the two sets.

24. Force measuring apparatus as claimed in claim 23 wherein said body is reduced in cross section on each side of each of said force applying elements to concentrate the flexural stresses at said force applying elements.

25. A force measuring apparatus as claimed in claim 23 wherein said load cell further includes a first force applying member engaged with said first set of force applying elements and a second force applying member engaged with said second set of force applying elements.

26. Force measuring apparatus as claimed in claim 25 wherein said first force applying member is threadedly attached with said first set of force applying elements and said second force applying member is threadedly attached to said second set of force applying members.

27. Force measuring apparatus as claimed in claim 25 wherein said first force applying member is integral with said first set of force applying elements and said second force applying member is integral with said second of force applying elements.

28. Force measuring apparatus as claimed in claim 19 further including a weighing platform overlying said load cell and means resiliently supporting said platform on said load cell.

29. Force measuring apparatus as claimed in claim 28 further including means defining a downwardly opening recess on said platform having a circular, axially extending wall, said means resiliently supporting said platform comprising an elastomeric O-ring received in said downwardly opening recess and projecting axially beyond said axially extending wall and restrained against radial expansion by said axially extending wall.

30. Force measuring apparatus as claimed in claim 29 wherein said load cell includes an upwardly axially projecting portion received in the O-ring of said platform with its outer periphery engaging the inner periphery of said O-ring and having a portion underlying the axially projecting portion of said O-ring whereby said platform is supported in said load cell in both an axial and transverse direction with respect to said load cell.

31. Force measuring apparatus as claimed in claim 30 wherein said load cell comprises an endless body having inner and outer peripheral surfaces extending between a pair of spaced end surfaces; a first set of force applying elements projecting from said body for applying forces in one axial direction to said body at spaced locations on said body; and a second set of force applying elements projecting from said body for applying forces in the opposite axial direction to said body at spaced locations on said body; the force applying elements of said first set being in staggered relationship with the force applying elements of said second set to cause flexural stressing of said body between adjacent force applying elements of the two sets.

32. Force measuring apparatus as claimed in claim 31 wherein wherein said body is reduced in cross section on each side of each of said force applying elements to concentrate the flexural stresses at said force applying elements.

33. Force measuring apparatus as claimed in claim 32 wherein said load cell further includes a first force applying member engaged with said first set of force applying element and a second force applying member engaged with said second set of force applying elements.

34. Force measuring apparatus as claimed in claim 33 wherein said first force applying member is integral with said first set of force applying elements and said second force applying member is integral with said second set of force applying elements.

* * * * *

UNITED STATES PATENT OFFICE
CERTIFICATE OF CORRECTION

Patent No. 3,636,760           Dated January 25, 1972

Inventor(s) Ralph S. Shoberg

It is certified that error appears in the above-identified patent and that said Letters Patent are hereby corrected as shown below:

Column 2, line 5 "weighting" should be --weighing--; column 2, line 14 "other" should be --outer--; column 2, line 23 "The" should be --A--; column 2, line 45 "THe" should be --The--. Column 3, line 1 "support" should be --supported--. Column 4, line 57 "he" should be --the--. Column 5, line 10 "recesses" should be --recessed--; column 5, line 26 "6" should be --4--; column 5, line 44 "the" should be --to--. Column 6, line 30 "16" should be --15--; column 6, line 40 "projection" should be --projecting--. Column 7, line 35 after "second" insert --set--. Column 8, line 34 "element" should be --elements--.

Signed and sealed this 15th day of August 1972.

(SEAL)
Attest:

EDWARD M. FLETCHER, JR.
Attesting Officer

ROBERT GOTTSCHALK
Commissioner of Patents